United States Patent
Cao

(10) Patent No.: US 7,409,702 B2
(45) Date of Patent: Aug. 5, 2008

(54) AUXILIARY PROGRAM ASSOCIATION TABLE

(75) Inventor: Adrean T. Cao, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 1234 days.

(21) Appl. No.: 10/393,324

(22) Filed: Mar. 20, 2003

(65) Prior Publication Data

US 2004/0187161 A1    Sep. 23, 2004

(51) Int. Cl.
| H04N 7/167 | (2006.01) |
| H04N 5/445 | (2006.01) |
| H04J 1/00  | (2006.01) |
| H04J 3/02  | (2006.01) |
| H04B 1/66  | (2006.01) |

(52) U.S. Cl. .......................... 725/110; 725/38; 725/54; 725/31; 725/114; 725/131; 370/537; 370/486; 370/487; 375/240; 375/240.26; 375/240.27

(58) Field of Classification Search ................. 375/240, 375/240.26–240.27; 370/537, 486, 487; 725/31, 38, 54, 110, 114, 131
See application file for complete search history.

(56) References Cited

U.S. PATENT DOCUMENTS

| 3,852,519 A | 12/1974 | Court |
| 4,381,519 A | 4/1983 | Wilkinson et al. |
| 4,419,693 A | 12/1983 | Wilkinson |
| 4,521,853 A | 6/1985 | Guttag |
| 4,634,808 A | 1/1987 | Moerder |
| 4,700,387 A | 10/1987 | Hirata |
| 4,703,351 A | 10/1987 | Kondo |

(Continued)

FOREIGN PATENT DOCUMENTS

EP    0471373    2/1992

(Continued)

OTHER PUBLICATIONS

Anonymous, Message Authentication with Partial encryption, Research disclosure RD 296086, Dec. 10, 1988.

(Continued)

*Primary Examiner*—Son P Huynh
(74) *Attorney, Agent, or Firm*—Miller Patent Services; Jerry A. Miller

(57) ABSTRACT

A method of identifying programs in a digital video communication system, consistent with certain embodiment of the present invention involve generating an auxiliary program association table (PAT) and an auxiliary program map table (PMT), wherein the auxiliary PAT and auxiliary PMT relate at least one program identifier (PID) to a program. The auxiliary PAT and auxiliary PMT are packetized and identified using a designated PID. The designated PID is encoded as private descriptor in a network information table (NIT) that is transmitted to the Set-top boxes (STB) over an out of band channel. The STBs have an out of band modem that receives a network information table (NIT). A NIT parser parses the NIT to obtain a designated program identifier (PID) for packets containing an auxiliary program association table (PAT) and an auxiliary program map table (PMT). A demultiplexer extracts packets containing the auxiliary PAT and auxiliary PMT based upon the designated PID to obtain PID values associated with programs for use in decoding and decrypting programs.

29 Claims, 6 Drawing Sheets

U.S. PATENT DOCUMENTS

| | | |
|---|---|---|
| 4,703,352 A | 10/1987 | Kondo |
| 4,710,811 A | 12/1987 | Kondo |
| 4,712,238 A | 12/1987 | Gilhousen et al. |
| 4,722,003 A | 1/1988 | Kondo |
| 4,739,510 A | 4/1988 | Jeffers et al. |
| 4,772,947 A | 9/1988 | Kondo |
| 4,785,361 A | 11/1988 | Brotby |
| 4,788,589 A | 11/1988 | Kondo |
| 4,815,078 A | 3/1989 | Shimura |
| 4,845,560 A | 7/1989 | Kondo et al. |
| 4,887,296 A | 12/1989 | Horne |
| 4,890,161 A | 12/1989 | Kondo |
| 4,914,515 A | 4/1990 | Van Luyt |
| 4,924,310 A | 5/1990 | von Brandt |
| 4,944,006 A | 7/1990 | Citta et al. |
| 4,953,023 A | 8/1990 | Kondo |
| 4,989,245 A | 1/1991 | Bennett |
| 4,995,080 A | 2/1991 | Bestler et al. |
| 5,018,197 A | 5/1991 | Jones et al. |
| 5,023,710 A | 6/1991 | Kondo et al. |
| 5,091,936 A | 2/1992 | Katznelson et al. |
| 5,122,873 A | 6/1992 | Golin |
| 5,138,659 A | 8/1992 | Kelkar et al. |
| 5,142,537 A | 8/1992 | Kutner et al. |
| 5,144,662 A | 9/1992 | Welmer |
| 5,144,664 A | 9/1992 | Esserman et al. |
| 5,151,782 A | 9/1992 | Ferraro |
| 5,159,452 A | 10/1992 | Kinoshita et al. |
| 5,196,931 A | 3/1993 | Kondo |
| 5,208,816 A | 5/1993 | Seshardi et al. |
| 5,237,424 A | 8/1993 | Nishino et al. |
| 5,237,610 A | 8/1993 | Gammie et al. |
| 5,241,381 A | 8/1993 | Kondo |
| 5,247,575 A | 9/1993 | Sprague et al. |
| 5,258,835 A | 11/1993 | Kato |
| 5,319,707 A | 6/1994 | Wasilewski et al. |
| 5,319,712 A | 6/1994 | Finkelstein et al. |
| 5,325,432 A | 6/1994 | Gardeck et al. |
| 5,327,502 A | 7/1994 | Katata |
| 5,341,425 A | 8/1994 | Wasilewski et al. |
| 5,359,694 A | 10/1994 | Concordel |
| 5,379,072 A | 1/1995 | Kondo |
| 5,381,481 A | 1/1995 | Gammie et al. |
| 5,398,078 A | 3/1995 | Masuda et al. |
| 5,400,401 A | 3/1995 | Wasilewski et al. |
| 5,414,852 A | 5/1995 | Kramer et al. |
| 5,416,651 A | 5/1995 | Uetake et al. |
| 5,416,847 A | 5/1995 | Boze |
| 5,420,866 A | 5/1995 | Wasilewski |
| 5,428,403 A | 6/1995 | Andrew et al. |
| 5,434,716 A | 7/1995 | Sugiyama et al. |
| 5,438,369 A | 8/1995 | Citta et al. |
| 5,444,491 A | 8/1995 | Lim |
| 5,444,782 A | 8/1995 | Adams, Jr. et al. |
| 5,455,862 A | 10/1995 | Hoskinson |
| 5,469,216 A | 11/1995 | Takahashi et al. |
| 5,471,501 A | 11/1995 | Parr et al. |
| 5,473,692 A | 12/1995 | Davis |
| 5,481,554 A | 1/1996 | Kondo |
| 5,481,627 A | 1/1996 | Kim |
| 5,485,577 A | 1/1996 | Eyer et al. |
| 5,491,748 A | 2/1996 | Auld, Jr. et al. |
| 5,526,427 A | 6/1996 | Thomas et al. |
| 5,528,608 A | 6/1996 | Shimizume |
| 5,535,276 A | 7/1996 | Ganesan |
| 5,539,823 A | 7/1996 | Martin |
| 5,539,828 A | 7/1996 | Davis |
| 5,553,141 A | 9/1996 | Lowry et al. |
| 5,555,305 A | 9/1996 | Robinson et al. |
| 5,561,713 A | 10/1996 | Suh |
| 5,568,552 A | 10/1996 | Davis |
| 5,574,787 A | 11/1996 | Ryan |
| 5,582,470 A | 12/1996 | Yu |
| 5,583,576 A | 12/1996 | Perlman et al. |
| 5,583,863 A | 12/1996 | Darr, Jr. et al. |
| 5,590,202 A | 12/1996 | Bestler et al. |
| 5,598,214 A | 1/1997 | Kondo et al. |
| 5,600,378 A * | 2/1997 | Wasilewski ............... 348/468 |
| 5,600,721 A | 2/1997 | Kitazato |
| 5,606,359 A | 2/1997 | Youden et al. |
| 5,608,448 A | 3/1997 | Smoral et al. |
| 5,615,265 A | 3/1997 | Coutrot |
| 5,617,333 A | 4/1997 | Oyamada et al. |
| 5,625,715 A | 4/1997 | Trew et al. |
| 5,629,981 A | 5/1997 | Nerlikar |
| 5,652,795 A | 7/1997 | Eillon et al. |
| 5,663,764 A | 9/1997 | Kondo et al. |
| 5,666,293 A | 9/1997 | Metz et al. |
| 5,696,906 A | 12/1997 | Peters et al. |
| 5,699,429 A | 12/1997 | Tamer et al. |
| 5,703,889 A | 12/1997 | Shimoda et al. |
| 5,717,814 A | 2/1998 | Abecassis |
| 5,726,702 A | 3/1998 | Hamaguchi et al. |
| 5,726,711 A | 3/1998 | Boyce |
| 5,732,346 A | 3/1998 | Lazaridis et al. |
| 5,742,680 A | 4/1998 | Wilson |
| 5,742,681 A | 4/1998 | Giachetti et al. |
| 5,751,280 A | 5/1998 | Abbott et al. |
| 5,751,743 A | 5/1998 | Takizawa |
| 5,751,813 A | 5/1998 | Dorenbos |
| 5,754,650 A | 5/1998 | Katznelson |
| 5,754,658 A | 5/1998 | Aucsmith |
| 5,757,417 A | 5/1998 | Aras et al. |
| 5,757,909 A | 5/1998 | Park |
| 5,768,539 A | 6/1998 | Metz et al. |
| 5,796,786 A | 8/1998 | Lee |
| 5,796,829 A | 8/1998 | Newby et al. |
| 5,796,840 A | 8/1998 | Davis |
| 5,802,176 A | 9/1998 | Audebert |
| 5,805,700 A | 9/1998 | Nardone et al. |
| 5,805,712 A | 9/1998 | Davis |
| 5,805,762 A | 9/1998 | Boyce et al. |
| 5,809,147 A | 9/1998 | De Lange et al. |
| 5,815,146 A | 9/1998 | Youden et al. |
| 5,818,934 A | 10/1998 | Cuccia |
| 5,825,879 A | 10/1998 | Davis |
| 5,850,218 A | 12/1998 | LaJoie et al. |
| 5,852,290 A | 12/1998 | Chaney |
| 5,852,470 A | 12/1998 | Kondo et al. |
| 5,870,474 A | 2/1999 | Wasiliewski et al. |
| 5,894,320 A | 4/1999 | Vancelette |
| 5,894,516 A | 4/1999 | Brandenburg |
| 5,915,018 A | 6/1999 | Aucsmith |
| 5,917,830 A * | 6/1999 | Chen et al. ............... 370/487 |
| 5,922,048 A | 7/1999 | Emura |
| 5,923,755 A | 7/1999 | Birch |
| 5,930,361 A | 7/1999 | Hayashi et al. |
| 5,933,500 A | 8/1999 | Blatter et al. |
| 5,940,738 A | 8/1999 | Rao |
| 5,943,605 A * | 8/1999 | Koepele, Jr. ............. 725/114 |
| 5,949,877 A | 9/1999 | Traw et al. |
| 5,949,881 A | 9/1999 | Davis |
| 5,963,909 A | 10/1999 | Warren et al. |
| 5,973,679 A | 10/1999 | Abbott et al. |
| 5,973,722 A | 10/1999 | Wakai et al. |
| 5,973,726 A | 10/1999 | Iijima et al. |
| 5,999,622 A | 12/1999 | Yasukawa et al. |
| 5,999,698 A | 12/1999 | Nakai et al. |
| 6,005,561 A | 12/1999 | Hawkins et al. |
| 6,011,849 A | 1/2000 | Orrin |
| 6,012,144 A | 1/2000 | Pickett |
| 6,016,348 A | 1/2000 | Blatter et al. |
| 6,021,199 A | 2/2000 | Ishibashi |
| 6,021,201 A | 2/2000 | Bakhle et al. |

| | | | | |
|---|---|---|---|---|
| 6,026,164 A | 2/2000 | Sakamoto et al. | 6,453,115 B1 | 9/2002 | Boyle |
| 6,028,932 A | 2/2000 | Park | 6,456,985 B1 | 9/2002 | Ohtsuka |
| 6,049,613 A | 4/2000 | Jakobsson | 6,459,427 B1 | 10/2002 | Mao et al. |
| 6,055,314 A | 4/2000 | Spies et al. | 6,463,152 B1 | 10/2002 | Takahashi |
| 6,055,315 A | 4/2000 | Doyle et al. | 6,466,671 B1 | 10/2002 | Maillard et al. |
| 6,057,872 A | 5/2000 | Candelore | 6,480,551 B1 * | 11/2002 | Ohishi et al. ................ 375/260 |
| 6,058,186 A | 5/2000 | Enari | 6,505,032 B1 | 1/2003 | McCorkle et al. |
| 6,058,192 A | 5/2000 | Guralnick et al. | 6,505,299 B1 | 1/2003 | Zeng et al. |
| 6,061,451 A | 5/2000 | Muratani et al. | 6,510,554 B1 | 1/2003 | Gorden et al. |
| 6,064,748 A | 5/2000 | Hogan | 6,519,693 B1 | 2/2003 | Debey |
| 6,065,050 A | 5/2000 | DeMoney | 6,526,144 B2 | 2/2003 | Markandey et al. |
| 6,069,647 A | 5/2000 | Sullivan et al. | 6,529,526 B1 | 3/2003 | Schneidewend |
| 6,070,245 A | 5/2000 | Murphy, Jr. et al. | 6,543,053 B1 | 4/2003 | Li et al. |
| 6,072,872 A | 6/2000 | Chang et al. | 6,549,229 B1 | 4/2003 | Kirby et al. |
| 6,072,873 A | 6/2000 | Bewick | 6,550,008 B1 | 4/2003 | Zhang et al. |
| 6,073,122 A | 6/2000 | Wool | 6,557,031 B1 | 4/2003 | Mimura et al. |
| 6,088,450 A | 7/2000 | Davis et al. | 6,590,979 B1 | 7/2003 | Ryan |
| 6,105,134 A | 8/2000 | Pinder et al. | 6,640,145 B2 | 10/2003 | Hoffberg et al. |
| 6,108,422 A | 8/2000 | Newby et al. | 6,640,305 B2 | 10/2003 | Kocher et al. |
| 6,115,821 A | 9/2000 | Newby et al. | 6,650,754 B2 | 11/2003 | Akiyama et al. |
| 6,118,873 A | 9/2000 | Lotspiech et al. | 6,654,389 B1 | 11/2003 | Brunheroto et al. |
| 6,134,237 A | 10/2000 | Brailean et al. | 6,678,740 B1 | 1/2004 | Rakib et al. |
| 6,134,551 A | 10/2000 | Aucsmith | 6,681,326 B2 | 1/2004 | Son et al. |
| 6,138,237 A | 10/2000 | Ruben et al. | 6,684,250 B2 | 1/2004 | Anderson et al. |
| 6,148,082 A | 11/2000 | Slattery et al. | 6,697,489 B1 | 2/2004 | Candelore |
| 6,154,206 A | 11/2000 | Ludtke | 6,697,944 B1 | 2/2004 | Jones et al. |
| 6,157,719 A | 12/2000 | Wasilewski et al. | 6,707,696 B1 | 3/2004 | Turner et al. |
| 6,181,334 B1 | 1/2001 | Freeman et al. | 6,714,650 B1 | 3/2004 | Maillard et al. |
| 6,185,369 B1 | 2/2001 | Ko et al. | 6,754,276 B1 | 6/2004 | Harumoto et al. |
| 6,185,546 B1 | 2/2001 | Davis | 6,772,340 B1 | 8/2004 | Peinado et al. |
| 6,189,096 B1 | 2/2001 | Haverty | 6,788,690 B2 | 9/2004 | Harri |
| 6,192,131 B1 | 2/2001 | Geer et al. | 6,788,882 B1 | 9/2004 | Geer et al. |
| 6,199,053 B1 | 3/2001 | Herbert et al. | 6,826,185 B1 | 11/2004 | Montanaro et al. |
| 6,204,843 B1 | 3/2001 | Freeman et al. | 6,883,050 B1 | 4/2005 | Safadi |
| 6,209,098 B1 | 3/2001 | Davis | 6,891,585 B2 | 5/2005 | Dieterich |
| 6,215,484 B1 | 4/2001 | Freeman et al. | 6,895,128 B2 | 5/2005 | Bohnenkamp |
| 6,219,358 B1 * | 4/2001 | Pinder et al. ................ 370/537 | 6,904,520 B1 | 6/2005 | Rosset et al. |
| 6,222,924 B1 | 4/2001 | Salomaki | 6,917,684 B1 | 7/2005 | Tatebayashi et al. |
| 6,223,290 B1 | 4/2001 | Larsen et al. | 6,938,162 B1 | 8/2005 | Nagai et al. |
| 6,226,618 B1 | 5/2001 | Downs | 6,976,166 B2 | 12/2005 | Herley et al. |
| 6,229,895 B1 | 5/2001 | Son et al. | 7,039,802 B1 | 5/2006 | Eskicioglu et al. |
| 6,230,194 B1 | 5/2001 | Frailong et al. | 7,039,938 B2 | 5/2006 | Candelore |
| 6,230,266 B1 | 5/2001 | Perlman et al. | 7,055,166 B1 | 5/2006 | Logan et al. |
| 6,236,727 B1 | 5/2001 | Ciacelli et al. | 7,065,213 B2 * | 6/2006 | Pinder ........................ 380/240 |
| 6,240,553 B1 | 5/2001 | Son et al. | 7,096,481 B1 | 8/2006 | Forecast et al. |
| 6,246,720 B1 | 6/2001 | Kutner et al. | 7,120,250 B2 | 10/2006 | Candelore |
| 6,256,747 B1 | 7/2001 | Inohara et al. | 7,124,303 B2 | 10/2006 | Candelore |
| 6,263,506 B1 | 7/2001 | Ezaki et al. | 7,127,619 B2 | 10/2006 | Unger et al. |
| 6,266,416 B1 | 7/2001 | Sigbjornsen et al. | 7,139,398 B2 | 11/2006 | Candelore et al. |
| 6,266,480 B1 | 7/2001 | Ezaki et al. | 7,146,007 B1 | 12/2006 | Maruo et al. |
| 6,272,538 B1 | 8/2001 | Holden et al. | 7,151,831 B2 | 12/2006 | Candelore et al. |
| 6,278,783 B1 | 8/2001 | Kocher et al. | 7,151,833 B2 | 12/2006 | Candelore et al. |
| 6,289,455 B1 | 9/2001 | Kocher et al. | 7,155,012 B2 | 12/2006 | Candelore et al. |
| 6,292,568 B1 | 9/2001 | Atkins, III et al. | 7,158,185 B2 * | 1/2007 | Gastaldi ................... 348/435.1 |
| 6,292,892 B1 | 9/2001 | Davis | 2001/0030959 A1 * | 10/2001 | Ozawa et al. ............... 370/386 |
| 6,307,939 B1 | 10/2001 | Vigarie | 2001/0036271 A1 | 11/2001 | Javed |
| 6,311,012 B1 | 10/2001 | Cho et al. | 2001/0051007 A1 | 12/2001 | Teshima |
| 6,314,111 B1 * | 11/2001 | Nandikonda et al. ........ 370/473 | 2002/0003881 A1 | 1/2002 | Reitmeier et al. |
| 6,324,288 B1 | 11/2001 | Hoffman | 2002/0021805 A1 | 2/2002 | Schumann et al. |
| 6,351,538 B1 | 2/2002 | Uz | 2002/0026587 A1 | 2/2002 | Talstra et al. |
| 6,351,813 B1 | 2/2002 | Mooney et al. | 2002/0044558 A1 | 4/2002 | Gobbi et al. |
| 6,377,589 B1 | 4/2002 | Knight et al. | 2002/0046406 A1 | 4/2002 | Chelehmal et al. |
| 6,378,130 B1 | 4/2002 | Adams | 2002/0047915 A1 | 4/2002 | Misu |
| 6,389,533 B1 | 5/2002 | Davis et al. | 2002/0059425 A1 | 5/2002 | Belfiore et al. |
| 6,389,537 B1 | 5/2002 | Davis et al. | 2002/0066101 A1 | 5/2002 | Gordon et al. |
| 6,415,031 B1 | 7/2002 | Colligan et al. | 2002/0083317 A1 | 6/2002 | Ohta et al. |
| 6,415,101 B1 | 7/2002 | deCarmo et al. | 2002/0083438 A1 | 6/2002 | So et al. |
| 6,418,169 B1 | 7/2002 | Datari | 2002/0097322 A1 | 7/2002 | Monroe et al. |
| 6,424,717 B1 | 7/2002 | Pinder et al. | 2002/0100054 A1 | 7/2002 | Feinberg et al. |
| 6,430,361 B2 | 8/2002 | Lee | 2002/0108035 A1 | 8/2002 | Herley et al. |
| 6,445,738 B1 | 9/2002 | Zdepski et al. | 2002/0116705 A1 | 8/2002 | Perlman et al. |
| 6,449,718 B1 | 9/2002 | Rucklidge et al. | 2002/0126890 A1 | 9/2002 | Katayama et al. |
| 6,452,923 B1 | 9/2002 | Gerszberg et al. | 2002/0129243 A1 | 9/2002 | Nanjundiah |

| | | |
|---|---|---|
| 2002/0144260 A1 | 10/2002 | Devara |
| 2002/0150239 A1 | 10/2002 | Camy et al. |
| 2002/0157115 A1 | 10/2002 | Lu |
| 2002/0157116 A1 | 10/2002 | Lu |
| 2002/0164022 A1 | 11/2002 | Strasser et al. |
| 2002/0170053 A1 | 11/2002 | Peterka et al. |
| 2002/0184506 A1 | 12/2002 | Perlman |
| 2002/0194613 A1 | 12/2002 | Unger |
| 2002/0196939 A1 | 12/2002 | Unger et al. |
| 2003/0002854 A1 | 1/2003 | Belknap et al. |
| 2003/0009669 A1 | 1/2003 | White et al. |
| 2003/0012286 A1 | 1/2003 | Ishtiaq et al. |
| 2003/0021412 A1 | 1/2003 | Candelore et al. |
| 2003/0026423 A1 | 2/2003 | Unger et al. |
| 2003/0026523 A1 | 2/2003 | Unger et al. |
| 2003/0028879 A1 | 2/2003 | Gordon et al. |
| 2003/0035482 A1 | 2/2003 | Klompenhouwer et al. |
| 2003/0035540 A1 | 2/2003 | Freeman et al. |
| 2003/0035543 A1 | 2/2003 | Gillon |
| 2003/0046686 A1 | 3/2003 | Candelore et al. |
| 2003/0046687 A1 | 3/2003 | Hodges et al. |
| 2003/0059047 A1 | 3/2003 | Iwamura |
| 2003/0063615 A1 | 4/2003 | Luoma et al. |
| 2003/0072555 A1 | 4/2003 | Yap et al. |
| 2003/0077071 A1 | 4/2003 | Lin et al. |
| 2003/0081630 A1 | 5/2003 | Mowery et al. |
| 2003/0081776 A1 | 5/2003 | Candelore |
| 2003/0084284 A1 | 5/2003 | Ando et al. |
| 2003/0097662 A1 | 5/2003 | Russ et al. |
| 2003/0112333 A1 | 6/2003 | Chen et al. |
| 2003/0118243 A1 | 6/2003 | Sezer et al. |
| 2003/0123664 A1 | 7/2003 | Pedlow, Jr. et al. |
| 2003/0123849 A1 | 7/2003 | Nallur et al. |
| 2003/0126086 A1 | 7/2003 | Safadi |
| 2003/0133570 A1 | 7/2003 | Candelore et al. |
| 2003/0140257 A1 | 7/2003 | Peterka et al. |
| 2003/0145329 A1 | 7/2003 | Candelore |
| 2003/0152224 A1 | 8/2003 | Candelore et al. |
| 2003/0152226 A1 | 8/2003 | Candelore et al. |
| 2003/0156716 A1 | 8/2003 | Candelore et al. |
| 2003/0156718 A1 | 8/2003 | Candelore et al. |
| 2003/0159139 A1 | 8/2003 | Candelore et al. |
| 2003/0159140 A1 | 8/2003 | Candelore |
| 2003/0159152 A1 | 8/2003 | Lin et al. |
| 2003/0174837 A1 | 9/2003 | Candelore et al. |
| 2003/0174844 A1 | 9/2003 | Candelore |
| 2003/0188154 A1 | 10/2003 | Dallard |
| 2003/0188164 A1 | 10/2003 | Okimoto et al. |
| 2003/0190054 A1 | 10/2003 | Troyansky et al. |
| 2003/0193973 A1 | 10/2003 | Takashimizu et al. |
| 2003/0198223 A1 | 10/2003 | Mack et al. |
| 2003/0204717 A1 | 10/2003 | Kuehnel |
| 2003/0222994 A1 | 12/2003 | Dawson |
| 2003/0226149 A1 | 12/2003 | Chun et al. |
| 2003/0228018 A1 | 12/2003 | Vince |
| 2004/0003008 A1 | 1/2004 | Wasilewski et al. |
| 2004/0010717 A1 | 1/2004 | Simec et al. |
| 2004/0021764 A1 | 2/2004 | Driscoll, Jr. et al. |
| 2004/0028227 A1 | 2/2004 | Yu |
| 2004/0047470 A1 | 3/2004 | Candelore |
| 2004/0049688 A1 | 3/2004 | Candelore et al. |
| 2004/0049690 A1 | 3/2004 | Candelore et al. |
| 2004/0049691 A1 | 3/2004 | Candelore et al. |
| 2004/0049694 A1 | 3/2004 | Candelore |
| 2004/0064688 A1 | 4/2004 | Jacobs |
| 2004/0068659 A1 | 4/2004 | Diehl |
| 2004/0073917 A1 | 4/2004 | Pedlow, Jr. et al. |
| 2004/0078575 A1 | 4/2004 | Morten et al. |
| 2004/0081333 A1 | 4/2004 | Grab et al. |
| 2004/0086127 A1 | 5/2004 | Candelore |
| 2004/0088552 A1 | 5/2004 | Candelore |
| 2004/0088558 A1 | 5/2004 | Candelore |
| 2004/0091109 A1 | 5/2004 | Son et al. |
| 2004/0100510 A1 | 5/2004 | Milic-Frayling et al. |
| 2004/0123094 A1 | 6/2004 | Sprunk |
| 2004/0136532 A1 | 7/2004 | Pinder et al. |
| 2004/0139337 A1 | 7/2004 | Pinder et al. |
| 2004/0151314 A1 | 8/2004 | Candelore |
| 2004/0158721 A1 | 8/2004 | Candelore |
| 2004/0165586 A1 | 8/2004 | Read et al. |
| 2004/0172650 A1 | 9/2004 | Hawkins et al. |
| 2004/0181666 A1 | 9/2004 | Candelore |
| 2004/0187161 A1 | 9/2004 | Cao |
| 2004/0193550 A1 | 9/2004 | Siegal |
| 2004/0240668 A1 | 12/2004 | Bonan et al. |
| 2004/0247122 A1 | 12/2004 | Hobrock et al. |
| 2004/0261099 A1 | 12/2004 | Durden et al. |
| 2004/0267602 A1 | 12/2004 | Gaydos et al. |
| 2005/0004875 A1 | 1/2005 | Kontio et al. |
| 2005/0028193 A1 | 2/2005 | Candelore et al. |
| 2005/0036067 A1 | 2/2005 | Ryal et al. |
| 2005/0063541 A1 | 3/2005 | Candelore |
| 2005/0066357 A1 | 3/2005 | Ryal |
| 2005/0071669 A1 | 3/2005 | Medvinsky et al. |
| 2005/0094808 A1 | 5/2005 | Pedlow, Jr. et al. |
| 2005/0094809 A1 | 5/2005 | Pedlow, Jr. et al. |
| 2005/0097596 A1 | 5/2005 | Pedlow, Jr. |
| 2005/0097597 A1 | 5/2005 | Pedlow, Jr. et al. |
| 2005/0097598 A1 | 5/2005 | Pedlow, Jr. et al. |
| 2005/0097614 A1 | 5/2005 | Pedlow, Jr. et al. |
| 2005/0102702 A1 | 5/2005 | Candelore et al. |
| 2005/0129233 A1 | 6/2005 | Pedlow, Jr. |
| 2005/0141713 A1 | 6/2005 | Genevois |
| 2005/0169473 A1 | 8/2005 | Candelore |
| 2005/0192904 A1 | 9/2005 | Candelore |
| 2005/0198586 A1 | 9/2005 | Sekiguchi et al. |
| 2005/0259813 A1 | 11/2005 | Wasilewski et al. |
| 2005/0265547 A1 | 12/2005 | Strasser et al. |
| 2005/0283797 A1 | 12/2005 | Eldering et al. |
| 2006/0115083 A1 | 6/2006 | Candelore et al. |
| 2006/0130119 A1 | 6/2006 | Candelore et al. |
| 2006/0130121 A1 | 6/2006 | Candelore et al. |
| 2006/0136976 A1 | 6/2006 | Coupe et al. |
| 2006/0153379 A1 | 7/2006 | Candelore et al. |
| 2006/0168616 A1 | 7/2006 | Candelore |
| 2006/0174264 A1 | 8/2006 | Candelore |
| 2006/0262926 A1 | 11/2006 | Candelore et al. |
| 2006/0269060 A1 | 11/2006 | Candelore et al. |

FOREIGN PATENT DOCUMENTS

| | | |
|---|---|---|
| EP | 0527611 | 7/1992 |
| EP | 0558016 | 2/1993 |
| EP | 0596826 | 4/1993 |
| EP | 0610587 | 12/1993 |
| EP | 0680209 | 4/1995 |
| EP | 0674440 | 9/1995 |
| EP | 0674441 | 9/1995 |
| EP | 0833517 | 4/1998 |
| EP | 0866615 | 9/1998 |
| EP | 1 187 483 A2 | 3/2002 |
| EP | 1187483 | 3/2002 |
| JP | 7067028 | 3/1995 |
| JP | 11243534 | 10/2002 |
| WO | WO 86/07224 | 12/1986 |
| WO | WO 94/10775 | 5/1994 |
| WO | WO 97/38530 | 10/1997 |
| WO | WO 00/31964 | 6/2000 |
| WO | WO 01/65762 | 9/2001 |
| WO | WO 01/78386 | 10/2001 |
| WO | WO 01/78386 A2 | 10/2001 |

OTHER PUBLICATIONS

"Performance Study of a Selective Encryption Scheme for the Security of Networked, Real-Time Video" by Spanos and Maples, pp. 2-10, 1995, IEEE.

"An Empirical Study of Secure MPEG Video Transmissions" by Agi and Gong, pp. 137-144, 1996, IEEE, Proceedings of SNDSS '96.

"Selective Encryption and Watermarking of MPEG Video (Extended Abstract)" by Wu and Wu, Feb. 17, 1997, submitted to International Conference on Image Science, Systems, and Technology, CISST'97.

"Run-Time Performance Evalution for a Secure MPEG System Supporting Both Selective Watermarking and Encryption" by Wu and Wu, Mar. 1, 1997, submitted to JSAC special issue on Copyright and Privacy Protection.

DVD Demystified—The Guidebook for DVD-Video and DVD-ROM by Jim Taylor, Pub. McGraw-Hill, 1998, ISBN: 0-07-064841-7, pp. 134-147.

"An Efficient MPEG Video Encryption Algorithm" by Shi and Bhargava, pp. 381-386, 1998 IEEE.

"Comparison of MPEG Encryption Algorithms" Qioa and Nahrstedt, Department of Computer Science, University of Illinois at Urbana-Champaign, Jan. 17, 1998.

"Applying Encryption to Video Communication" by Kunkelmann, pp. 41-47, Sep. 1998, Multimedia and Security Workshop at ACM Multimedia '98, Bristol, U.K.

Anonymous, New Digital Copy Protection Proposal Would Serve Authorized Copies, PR Newswire, Nov. 1988, pp. 1-3.

"Evaluation of Selective Encryption Techniques for Secure Transmission of MPEG-Compressed Bit-Streams" by Alattar and Al-Regib, pp. IV-340 to IV-343m 1999, IEEE.

"Improved Selective Encryption Techniques for Secure Transmission of MPEG Video Bit-Streams" by Alattar, Al-Regib and Al-Semari, pp. 256-260, 1999, IEEE.

"Efficient Frequency Domain Video Scrambling for Content Access Control" by Zeng and Lei, Nov. 1999, In Proc. ACM Multimedia.

"Transport Streams Insertion of Video in the Compressed Digital Domain" by SeaChange Internation, Web Site Literature, 2000.

"A Report on Security Issues in Multimedia" by Gulwani, pp. 10-14, Apr. 30, 2000, (Boston, Ma.,USA).

"Fast Encryption Methods for Audiovisual Data Confidentiality" by Wu and Kuo, Nov. 2000, SPIE International Symposia on Information Technologies 2000, (Boston, Ma., USA).

"Visible World—A High Impact Approach to Customized Television Advertising" by Haberman, Dec. 2001.

"Pre-Encryption Profiles Concept Overview and Proposal" Rev. 1.2, John B. Carlucci, Dec. 5, 2000.

"Ad Agencies and Advertisers To Be Empowered with Targeted Ads Delivered by Television's Prevailing Video Servers" Article Business Section of The New York Times, Updated Thrusday, Dec. 20, 2001.

"Dynamic-Customized TV Advertising Creation and Production Tools" by SeaChange International, Web Site Literature, Date Unknown.

Alattar, A.M. et al., Improved selective encryption techniques for secure transmission of MPEG video bitstreams, Oct. 24, 1999, Digimarc Corp., Lake Oswego, OR, USA, IEEE, pp. 256-260.

Kunkelmann T. et al., A scalable security architecture for multimedia communication standards, Darmstard Univ. of Technology, ITO, Germany, 1997, pp. 660-661.

Yip, Kun-Wah, Partial-encryption technique for intellectual property protection of FPGA-Based products, Dec. 15, 1999, IEEE, pp. 183-190.

International Search Report for application No. PCT/US2004/032228.

"How Networks Work—Milennium Edition"—pp. 88-89, Que Corporation, 2000.

Microsoft Screen Shots and Help Files, Oct. 2001, Microsoft Windows XP, U.S. Appl. No. 10/634,546.

MPEG-2 Digital Broadcast Pocket Guide vol. 6, 2001, Acterna, LLC, U.S. Appl. No. 10/667,614.

Microsoft Windows XP, Oct. 2001, Microsoft, Screen Shots and Help Files.

MPEG-2 Digital Broadcast Pocket Guide vol. 6, Copyright 201 Acterna, LLC.

Liu, et al. Motion Vector Encryption in Multimedia Streaming, 2004, IEEE, pp. 64-71.

Critical Packet Partial Encryption, U.S. Appl. No. 10/038,217, filed Jan. 2, 2002.

Time Division Partial Encryption, U.S. Appl. No. 10/038,032, filed Jan. 2, 2002.

Elementary Stream Partial Encryption, U.S. Appl. No. 10/037,914, filed Jan. 2, 2002.

Partial Encryption and PID Mapping, U.S. Appl. No. 10/037,499, filed Jan. 2, 2002.

Decoding and Decryption of Partially Encrypted Information, U.S. Appl. No. 10/037,498, filed Jan. 2, 2002.

Video Slice and Active Region Based Dual Partial Encryption, U.S. Appl. No. 10/273,905, filed Oct. 18, 2002.

Selective Encryption for Video on Demand, U.S. Appl. No. 10/319,133, filed Dec. 13, 2002.

Encryption and Content Control in a Digital Broadcast System, U.S. Appl. No. 10/273,875, filed Oct. 18, 2002.

Reconstitution of Program Streams Split Across Multiple Program Identifiers, U.S. Appl. No. 10/084,106, filed Feb. 27, 2002.

Star Pattern Partial Encryption, U.S. Appl. No. 10/273,903, filed Oct. 18, 2002.

Slice Mask and Moat Pattern Partial Encrytpion, U.S. Appl. No. 10/274,084, filed Oct. 18, 2002.

Content Replacement by PID Mapping, U.S. Appl. No. 10/319,066, filed Dec. 13, 2002.

Upgrading of Encryption, U.S. Appl. No. 10/293,761, filed Nov. 13, 2002.

Content Distribution for Multiple Digital Rights Management, U.S. Appl. No. 10/318,782, filed Dec. 13, 2002.

Selective Encryption to Enable Multiple Decryption Keys, U.S. Appl. No. 10/319,169, filed Dec. 13, 2002.

Multiple Partial Encryption Using Retuning, U.S. Appl. No. 10/273,904, filed Oct. 18, 2002.

Selective Encryption to Enable Trick Play, U.S. Appl. No. 10/319,096, filed Dec. 12, 2002, Abandoned.

Selective Encryption to Enable Trick Play, U.S. Appl. No. 10/391,940, filed Mar. 19, 2003.

Progressive Video Refresh Slice Detection, U.S. Appl. No. 10/303,594, filed Nov. 25, 2002.

Video Scene Change Detection, U.S. Appl. No. 10/274,019, filed Oct. 18, 2002.

Auxiliary Program Association Table, U.S. Appl. No. 10/393,324, filed Mar. 20, 2003.

PID Filter Based Network Routing, U.S. Appl. No. 103/373,479, filed Feb. 24, 2003.

Content Scrambling With Minimal Impact on Legacy Devices, U.S. Appl. No. 10/767,421, filed Jan. 29, 2004.

Decryption System, U.S. Appl. No. 10/662,585, filed Sep. 15, 2003.

Modifying Content Rating, U.S. Appl. No. 10/667,614, filed Sep. 22, 2003.

Variable Perspective View of Video Images, U.S. Appl. No. 10/634,546, filed Aug. 5, 2003.

Macro-Block Based Content Replacement by PID Mapping, U.S. Appl. No. 10/822,891, filed Apr. 13, 2004.

Re-Encrypted Delivery of Video On Demand Content, U.S. Appl. No. 10/764,202, filed Jan. 23, 2004.

Batch Mode Session-based Encryption of Video on Demand Content, U.S. Appl. No. 10/828,737, filed Apr. 21, 2004.

Bi-Directional Indices for Trick Mode Video-on-Demand, U.S. Appl. No. 10/764,011, filed Jan. 23, 2004.

Hybrid Storage of Video on Demand Content, U.S. Appl. No. 10/802,084, filed Mar. 16, 2004.

Dynamic Composition of Pre-Encrypted Video on Demand Content, U.S. Appl. No. 10/802,007, filed Mar. 16, 2004.

Cablecard with Content Manipulation, U.S. Appl. No. 10/774,871, filed Feb. 9, 2004.

Preparation of Content for Multiple Conditional Access Methods in Video on Demand, U.S. Appl. No. 10/802,008, filed Mar. 16, 2004.

Composite Session-Based Encryption of Video on Demand, U.S. Appl. No. 10/823,431, filed Apr. 13, 2004.

Multiple Selective Encryption with DRM, U.S. Appl. No. 10/964,267, filed Oct. 13, 2004.

Method And Apparatus For Securing Control Words, U.S. Appl. No. 10/763,865, filed Jan. 22, 2004.

Method and Apparatus for Protecting the Transfer of Data, U.S. Appl. No. 10/387,163, filed Mar. 22, 2003.

IP Delivery of Secure Digital Content, U.S. Appl. No. 10/815,371, filed Mar. 31, 2004.
System, Method and Apparatus for Secure Digital Content Transmission, U.S. Appl. No. 10/764,682, filed Jan. 23, 2004.
Mechanism for Protecting the Transfer of Digital Content, U.S. Appl. No. 10/388,002, filed Mar. 12, 2003.
Descrambler, U.S. Appl. No. 10/690,192, filed Mar. 12, 2003.
Multi-Process, U.S. Appl. No. 10/691,170, filed Oct. 5, 2003.
System and Method for Partially Encrypted Multimedia System, U.S. Appl. No. 10/403,834, filed Mar. 31, 2003.
"A Report on Security Issues in Multimedia" by Gulwani, pp. 10-14, Apr. 30, 2000, Course Notes, Department of Computer Science and Engineering, Indian Institute of Technology Kanpur.
"Ad Agencies and Advertisers To Be Empowered with Targeted Ads Delivered by Television's Prevailing Video Servers" Article Business Section of The New York Times, Updated Thursday, Dec. 20, 2001.
"An Efficient MPEG Video Encryption Algorithm" by Shi and Bhargava, pp. 381-386, 1998 IEEE.
"An Empirical Study of Secure MPEG Video Transmissions" by Agi and Gong, pp. 137-144, 1996, IEEE, Proceedings of SNDSS '96.
"Applying Encryption to Video Communication" by Kunkelmann, pp. 41-47, Sep. 1998, Multimedia and Security Workshop at ACM Multimedia '98. Bristol, U.K.
"Comparison of MPEG Encryption Algorithms" by Qiao and Nahrstedt, Jan. 17, 1998, Preprint submitted to Elsevier Science.
"Coral Consortium Aims to Make DRM Interoperable", by Bill Rosenblatt, Oct. 7, 2004, online at http://www.drmwatch.com/standards/article.php/3418741.
"DVD Demystified—The Guidebook for DVD-Video and DVD-ROM" by Jim Taylor, Pub. McGraw-Hill, 1998, ISBN: 0-07-064841-7, pp. 134-147.
"Dynamic-Customized TV Advertising Creation and Production Tools" by SeaChange International, Web Site Literature.
"Efficient Frequency Domain Video Scrambling for Content Access Control" by Zeng and Lei, Nov. 1999, In Proc. ACM Multimedia.
"Evaluation of Selective Encryption Techniques for Secure Transmission of MPEG-Compressed Bit-Streams" by Alattar and Al-Regib, pp. IV-340 to IV-343, 1999, IEEE.
"Fast Encryption Methods for Audiovisual Data Confidentiality" by Wu and Kuo, Nov. 2000, SPIE International Symposia on Information Technologies 2000, (Boston, Ma., USA).
"Improved Selective Encryption Techniques for Secure Transmission of MPEG Video Bit-Streams" by Alattar, Al-Regib and Al-Semari, pp. 256-260, 1999, IEEE.
Metro Media™ PVR-DVD-MP3-Web—Internet publication from www.metrolink.com, undated.
"Multimedia and Security Workshop at ACM Multimedia" '98. Bristol, U.K., Sep. 1998.
"Passage™, Freedom to Choose", 2003, Sony Electronics Inc.
"Performance Study of a Selective Encryption Scheme for the Security of Networked, Real-Time Video" by Spanos and Maples, pp. 2-10, 1995, IEEE.
"Pre-Encryption Profiles—Concept Overview and Proposal", Rev. 1.2 as submitted to the Open CAS consortium on Dec. 28, 2000.

"Run-Time Performance Evaluation for a Secure MPEG System Supporting Both Selective Watermarking and Encryption" by Wu and Wu, Mar. 1, 1997, submitted to JSAC special issue on Copyright and Privacy Protection.
"Selective Encryption and Watermarking of MPEG Video (Extended Abstract)" by Wu and Wu, Feb. 17, 1997, submitted to International Conference on Image Science, Systems, and Technology, CISST'97.
"The Long March to Interoperable Digital Rights Management" by Koenen et al., pp. 1-17, 2004, IEEE.
"Transport Streams Insertion of Video in the Compressed Digital Domain" by SeaChange International, Web Site Literature, 2000.
"Visible World—A High Impact Approach to Customized Television Advertising" by Haberman, Dec. 2001.
Anonymous, Message Authentication with Partial Encryption, Research discosure RD 296086, Dec. 10, 1998.
Anonymous, New Digital Copy Protection Proposal Would Secure Authorized Copies, PR Newswire, Nov. 1998, pp. 1-3.
Aravind, H., et al., "Image and Video Coding Standards", AT&T Technical Journal, (Jan./Feb. 1993),67-68.
Gonzalez, R. C., et al., "Digital Image Processing", Addison Wesley Publishing Company, Inc., (1992),346-348.
Kim, et al., "Bit Rate Reduction Algorithm for a Digital VCR", IEEE Transactions on Consumer Electronics, vol. 37, No. 3, (Aug. 1, 1992),267-274.
Kondo, et al., "A New Concealment Method for Digital VCRs", IEEE Visual Signal Processing and Communication, Melbourne, Australia,(Sep. 1993),20-22.
Kondo, et al., "Adaptive Dynamic Range Coding Scheme for Future Consumer Digital VTR", 219-226.
Kondo, et al., "Adaptive Dynamic Range Coding Scheme for Future HDTV Digital VTR", Sony Corporation, (1991).
Lakshiminath, et al., "A Dual Protocol for Scalable Secure Multicasting", 1999 International Symposium on Computers and Communication, Jul. 6-8, 1999.
Lookabaugh et al., "Selective Encryption and MPEG-2", ACM Multimedia '03, Nov. 2003.
Menezes, Alfred J., et al., "Handbook of Applied Cryptography", CRC Press, 551-553.
NHK Laboratories Note, "Error Correction, Concealment and Shuffling", No. 424, (Mar. 1994),29-44.
Park, et al., "A Simple Concealment for ATM Bursty Cell Loss", IEEE Transactions on Consumer Electronics, No. 3, (Aug. 1993),704-709.
Robert et al., "Digital Cable: The Key to Your Content", Access Intelligence's Cable Group, Feb. 2002, online at http:www.cableworld.com/ct/archives/0202/0202digitalrights.htm.
Tom, et al., "Packet Video for Cell Loss Protection Using Deinterleaving and Scrambling", ICASSP 91: 1991 International Conference on Acoustics, Speech and Signal Processing, vol. 4, (Apr. 1991),2857-2860.
Zhu, et al., "Coding and Cell-Loss Recovery in DCT-Based Packet Video", IEEE Transactions on Circuits and Systems for Video Technology, No. 3, NY,(Jun. 3, 1993).
"ClearPlay: The Technology of Choice", from web site, ClearPay 2001-2003.

* cited by examiner

AUXILIARY PROGRAM ASSOCIATION TABLE

CROSS REFERENCE TO RELATED DOCUMENTS

This application is related to patent applications entitled "Critical Packet Partial Encryption" to Unger et al., Ser. No. 10/038,217; patent applications entitled "Time Division Partial Encryption" to Candelore et al., Ser. No. 10/038,032; entitled "Elementary Stream Partial Encryption" to Candelore, Ser. No. 10/037,914; entitled "Partial Encryption and PID Mapping" to Unger et al., Ser. No. 10/037,499; and "Decoding and Decrypting of Partially Encrypted Information" to Unger et al., Ser. No. 10/037,498 all of which were filed on Jan. 2, 2002 and are hereby incorporated by reference herein.

COPYRIGHT NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever.

FIELD OF THE INVENTION

This invention relates generally to the field of digital video. More particularly, certain embodiments consistent with the present invention relate to conveying a secondary or auxiliary set of program association information in a digital video system in a manner particularly useful for use in conjunction with a selective encryption scenario.

BACKGROUND OF THE INVENTION

A conventional cable system arrangement is depicted in FIG. 1. In such a system, the cable operator processes audio/video (A/V) content 14 with conditional access (CA) technology from manufacturer A (system A) using CA encryption equipment 18 compliant with system A at the cable system-headend 22. The encrypted A/V content along with system information (SI) 26 and program specific information (PSI) 27 is multiplexed together and transmitted over the cable network 32 to a user's Set-top box (STB) or other receiver 36. STB 36 incorporates decrypting CA equipment from system A (manufacturer A) 40 that decrypts the A/V content. The decrypted A/V content can then be supplied to a television set 44 for viewing by the user.

In a cable system such as that of FIG. 1, digital program streams are broken into packets for transmission. Packets for each component of a program (video, audio, auxiliary data, etc.) are tagged with a packet identifier or PID. These packet streams for each component of all programs carried within a channel are aggregated into one composite stream. Additional packets are also included to provide decryption keys and other overhead information. Otherwise unused bandwidth is filled with null packets.

Since the encryption process defined by conditional access system A is proprietary to the manufacturer of the STB 36, it is difficult and expensive for a cable operator to utilize alternative sources for this hardware. Consequently, the cable or satellite operator may be locked in to a particular supplier for hardware.

The above-referenced commonly owned patent applications, and others, address this issue and therein describe inventions relating to various aspects of methods generally referred to herein as partial encryption or selective encryption. More particularly, systems are described therein wherein selected portions of a particular selection of digital content are encrypted using two (or more) encryption techniques while other portions of the content are left unencrypted. By properly selecting the portions to be encrypted, the content can effectively be encrypted for use under multiple decryption systems without the necessity of encryption of the entire selection of content. In some embodiments, only a few percent of data overhead is needed to effectively encrypt the content using multiple encryption systems. This results in a cable or satellite system being able to utilize Set-top boxes (STB) or other implementations of conditional access (CA) receivers from multiple manufacturers in a single system—thus freeing the cable or satellite company to competitively shop for providers of Set-top boxes.

In each of these disclosures, the content is carried in the clear using a primary Packet Identifier (PID). A secondary PID (or shadow PID) is also assigned to the program content. Selected portions of the content are then encrypted under two (or more) encryption systems and the encrypted content transmitted using both the primary and secondary PIDs (one PID or set of PIDs for each encryption system). The so-called legacy STBs operate in a normal manner decrypting encrypted packets arriving under the primary PID and ignoring secondary PIDs. The newer (non-legacy) STBs operate by associating both the primary and secondary PIDs with a single program. Packets with a primary PID are decoded normally and packets with a secondary PID are first decrypted then decoded. The packets associated with both PIDs are then assembled together to make up a single program stream. Certain embodiments consistent with the present invention address a mechanism for conveying the PIDs to the non-legacy STBs in a manner that does not disrupt the operation of legacy STBs or otherwise violate rules generally used for transmission of digital video signals to the legacy STBs.

BRIEF DESCRIPTION OF THE DRAWINGS

The features of the invention believed to be novel are set forth with particularity in the appended claims. The invention itself however, both as to organization and method of operation, together with objects and advantages thereof, may be best understood by reference to the following detailed description of the invention, which describes certain exemplary embodiments of the invention, taken in conjunction with the accompanying drawings in which:

DETAILED DESCRIPTION OF THE INVENTION

Figure 1:
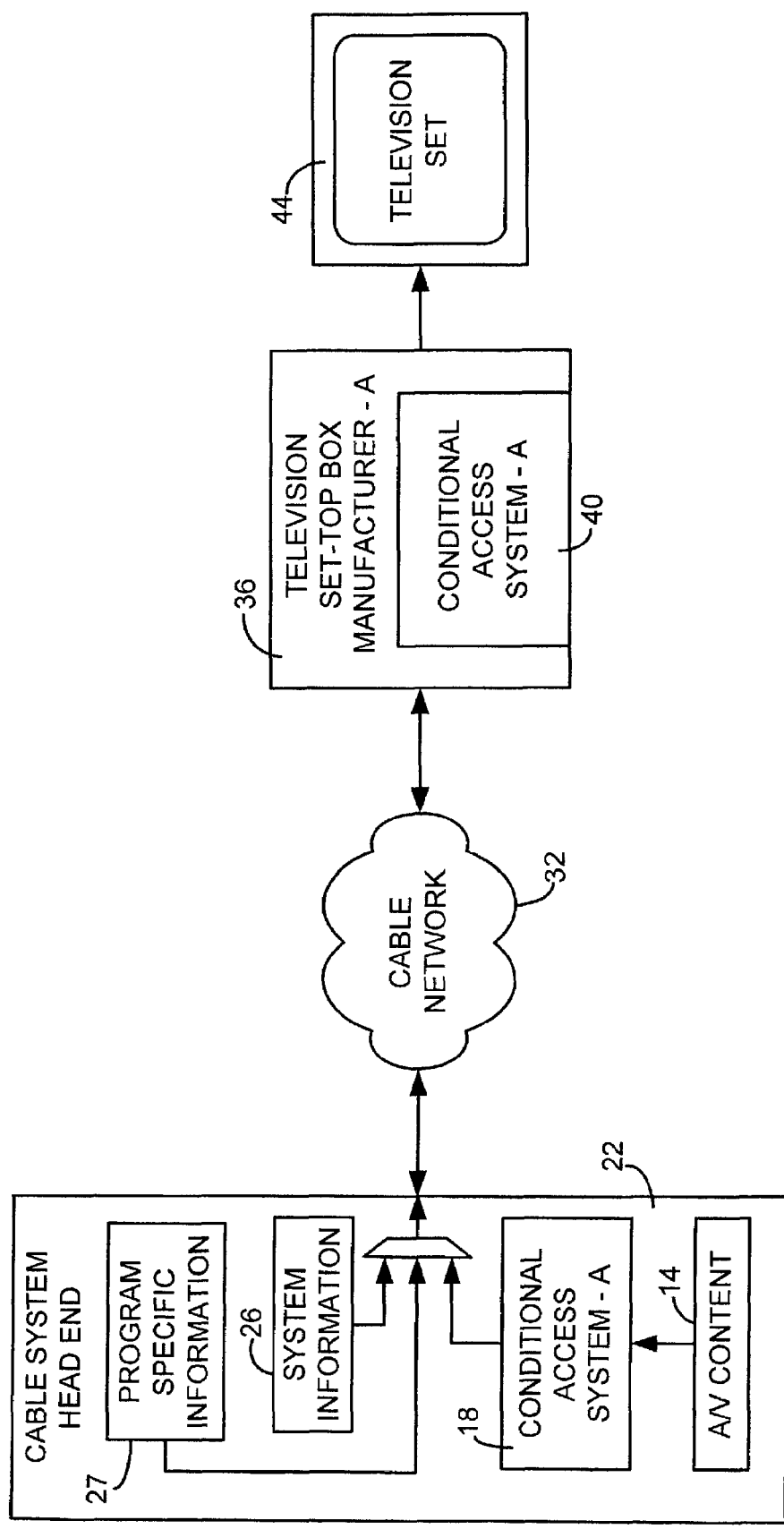
FIG. 1 is a block diagram of a conventional cable television system.

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals are used to describe the same, similar or corresponding parts in the several views of the drawings.

The terms "scramble" and "encrypt" and variations thereof are used synonymously herein. Also, the term "television program" and similar terms can be interpreted in the normal conversational sense, as well as a meaning wherein the term means any segment of A/V content that can be displayed on a television set or similar monitor device. The term "video" can be used herein to embrace not only true visual information, but also in the conversational sense (e.g., "video tape recorder") to embrace not only video signals but associated audio and data. The term "legacy" as used herein refers to existing technology used for existing cable and satellite systems. The exemplary embodiments disclosed herein are decoded by a television Set-Top Box (STB), but it is contemplated that such technology will soon be incorporated within television receivers of all types whether housed in a separate enclosure alone or in conjunction with recording and/or playback equipment or within a television set itself. The present document generally uses the example of a "dual partial encryption" embodiment, but those skilled in the art will recognize that the present invention can be utilized to realize multiple partial encryption without departing from the invention. The terms "partial encryption" and "selective encryption" are used synonymously herein. The terms "secondary PID" and "shadow PID" can also be used interchangeably.

Figure 2:
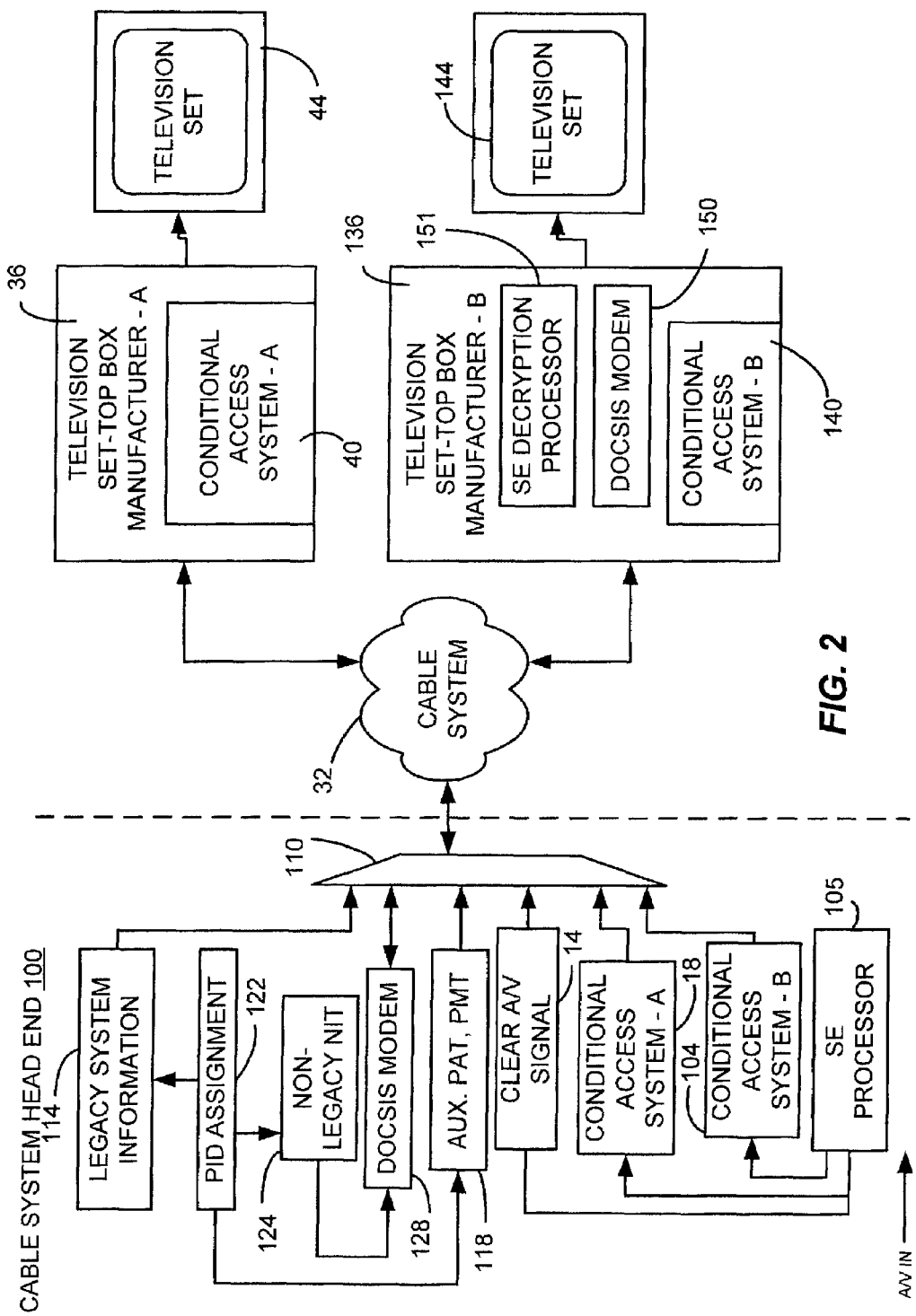
FIG. 2 is block diagram of a dual encrypted cable television system consistent with certain embodiments of the present invention.

The following is a partial list of acronyms used herein:
bslbf bit string, left bit first
DVB Digital Video Broadcasting
HE Headend
NIT Network Information Table
PAT Program Association Table
PMT Program Map Table
PID Packet Identifier
rpchof remainder polynomial coefficients, highest order first
Si System Information
STB Set-Top Box
TS Transport Stream
uimsbf unsigned integer, most significant bit first Turning now to FIG. 2, an exemplary cable television system suitable for use in practicing a dual encryption embodiment of the present invention is illustrated. Those skilled in the art will appreciate that the present invention could also be implemented using more than two encryptions systems or within another type of network (e.g., a satellite system), or with other systems having need or use for unconventional PID assignments, PMT and/or PAT tables, without departing from the present invention. The illustrated head end 100 implements the assignment (or equivalently conveying) of certain PID values to non-legacy STBs using an auxiliary Network Information Table (NIT) as will be described hereinafter. Head end 100 receives scrambled content from one or more suppliers, for example, using a satellite dish antenna that feeds a satellite receiver (not shown). The satellite receiver operates to demodulate and descramble the incoming content and supplies the content as a stream of clear (unencrypted) data.

It is assumed, for purposes of the present embodiment of the invention, that the data from the satellite receiver is supplied as MPEG (Moving Pictures Expert Group) compliant packetized data. This unencrypted (clear) digital television signal 14 is selectively applied to a first conditional access encryption system A 18 as well as to a second conditional access encryption system B 104. Encryption system 18 can be the legacy encryption system as used in the conventional single encryption system of FIG. 1. Encryption system 104 can be a new (non-legacy) encryption system that is to be added to the cable (or equivalently satellite) television system. A clear A/V signal is received (e.g., from a decrypted HITS feed) at a Selective Encryption (SE) Processor 105 that appropriately routs incoming packets to either the encryption system 104, the encryption system 18 or directly as clear AV content (14) to a multiplexer 110. The clear A/V signal 14 and multiple sets of encrypted packets are applied to multiplexer 110 for transmission over the cable system as will be described shortly. Encrypted portions of the clear signal 14 as produced by encryption systems 18 and 104 are also selectively applied to multiplexer 110 in accordance with embodiments consistent with the present invention as will be described.

In addition to these signals, system and program specific information is also applied to multiplexer 110. Such information includes, but is not limited to program association tables (PAT), program map tables (PMT), conditional access tables (CAT), etc. and are supplied as legacy system information 114 in a conventional manner. Additionally, the cable system head end 100 has an auxiliary PAT and auxiliary PMT assignment function 118 that generates PAT and PMT information that is placed in packets that are identified to non-legacy STBs such as 136 using a designated PID value for such information. This designated PID is assigned or allocated by PID assignment functional block 122 which also generates or otherwise assembles information for auxiliary PAT and auxiliary PMT tables 11 8. Moreover, the designated PID value used to identify packets containing the auxiliary PAT table is supplied to a functional block 124 that assembles the auxiliary Network Information Table in a manner to be described, and transmits this information through multiplexer 110. In certain embodiments, this information is transmitted using a DOCSIS modem 128 and an out of band (OOB) channel (88-860 Mhz) or virtual OOB channel designated for communication using the DOCS IS or other OOB or virtual OOB modem, however, this should not be considered limiting, since this information can be transmitted using any other suitable out of band or inband communication mechanism without departing from the invention.

In accordance with the operation of certain embodiments consistent with the present invention, selected segments of the A/V content are encrypted under both encryption systems 18 and 104. In accordance with any suitable algorithm, segments of the clear A/V content are selected for encryption. Any given selected segment that is to be dual encrypted is duplicated and encrypted by both systems 18 and 104. These selected segments are then inserted at multiplexer 110 into the outbound data stream in place of the corresponding original, unencrypted content. These selected encrypted segments are inserted as content in the same channel as the unencrypted content (channel A) as well as in a second channel (channel B).

When a segment is selected for encryption, it is encrypted under both the conditional access system A 18 as well as conditional access system B 104. The encrypted segments are then each assigned PID values that identify the packets which are encrypted under each respective system. The PID values assigned to the encrypted segments of content are conveyed to the legacy STBs or other receivers using the PAT and PMT tables in a conventional manner. The non-legacy STBs such as 136 receive this information in a different manner. The auxiliary NIT table (that is, the NIT table containing the auxiliary PAT descriptor) is transmitted to the STB 136 via an out of band (or inband) channel such as a DOCSIS compliant channel and is received by the STB 136's DOCSIS modem 150. This auxiliary NIT table conveys the value of the designated PID, along with tuning information to the STB 136. STB 136 can thus obtain the auxiliary PAT and auxiliary PMT tables by looking for the designated PID in a specified transport stream. The NIT is processed along with the PAT and PMT tables using a Selective Encryption (SE) decryption processor 151 as will be understood upon consideration of the discussions to follow.

Thus, when the STB 36 receives the program information, it ignores the information encrypted under encryption system B, since it has no knowledge of such information. Similarly, when the STB 136 receives the program information, it ignores the information encrypted under encryption system A, by ignoring encrypted packets having the primary PID in a manner described in the above-referenced patent applications.

In this manner, STB 136 need not comply with the conditional access system A 40 of STB 36 and can thus be supplied by a different manufacturer (avoiding need for a license to conditional access system A). The unencrypted and decrypted A/V signal is then passed to television set 144. At the legacy STB 36 using conditional access system A 40, a mixture of encrypted and unencrypted packets are received. Conditional access system A decrypter 40 on such systems automatically decrypt that which is encrypted and pass that which is not. Thus, STB 36 behaves normally with the dual selective encryption mechanism operating transparently.

Figure 3:
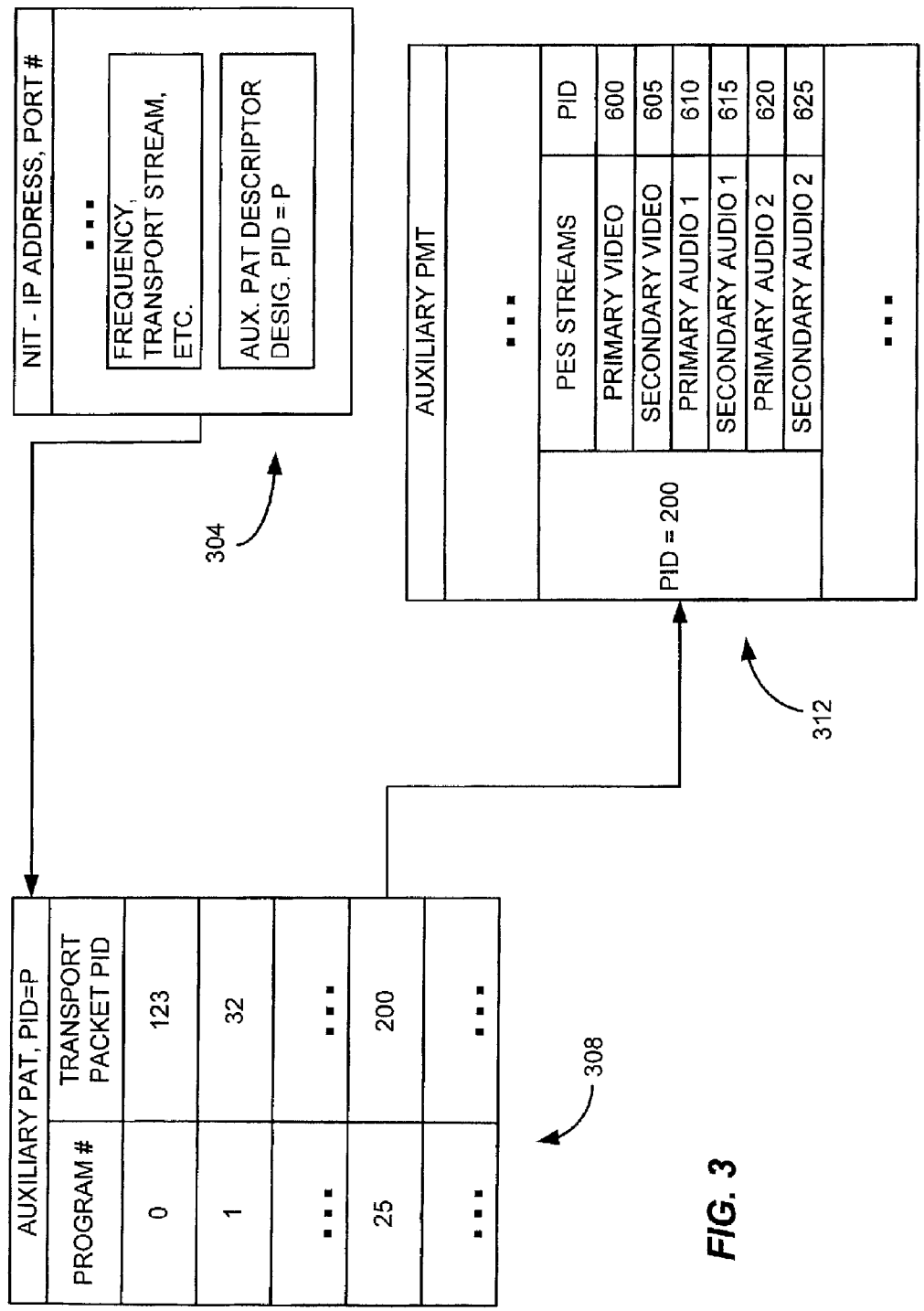
FIG. 3 illustrates set of tables as used consistent with certain embodiments of the present invention.

FIG. 3 depicts relationships between the various tables used to identify programming consistent with certain embodiments of the present invention. An MPEG 2 compliant digital video system is presumed for the present example, but this should not be considered limiting. In accord with the present embodiment, an out of band channel (i.e., a DOCSIS modem communication path) is used to communicate a DVD compliant auxiliary NIT table 304 (in this example) to a receiver such as a television STB. In this example, the auxiliary NIT may be DVD compliant, while in other embodiments, the auxiliary NIT may be DVB (Digital Video Broadcasting) or DVS (Digital Video Subcommittee of the Society of Cable Television Engeering) compliant, or compliant with any other suitable digital video standard without departing from the present invention. This auxiliary NIT 304 provides information such as frequency, network ID, Transport stream ID and other information used by the STB (non-legacy) to tune to a particular set of inband transport streams. Table 1 below shows the format of such an auxiliary NIT table 304:

TABLE 1

| Syntax | No. of Bits | Identifier |
|---|---|---|
| Network_information_section( ){ | | |
|   table_id | 8 | uimsbf |
|   section_syntax_indicator | 1 | bslbf |
|   reserved_future_use | 1 | bslbf |
|   reserved | 2 | bslbf |

TABLE 1-continued

| Syntax | No. of Bits | Identifier |
|---|---|---|
|   section_length | 12 | uimsbf |
|   network_id | 16 | uimsbf |
|   reserved | 2 | bslbf |
|   version_number | 5 | uimsbf |
|   current_next_indicator | 1 | bslbf |
|   section_number | 8 | uimsbf |
|   last_section_number | 8 | uimsbf |
|   reserved_future_used | 4 | bslbf |
|   network_descriptor_length | 12 | uimsbf |
|   for (i=0;i<N;i++){ | | |
|     descriptor( ) | | |
|   } | | |
|   reserved_future_use | 4 | bslbf |
|   transport_stream_loop_length | 12 | uimsbf |
|   for (i=0;i<N;i++){ | | |
|     transport_stream_id | 16 | uimsbf |
|     original_network_id | 16 | uimsbf |
|     reserved_future_use | 4 | bslbf |
|     transport_descriptors_length | 12 | uimsbf |
|     for (j=0;j<N;j++){ | | |
|       descriptor( ) | | |
|     } | | |
|   } | | |
|   CRC_32 | 32 | rpchof |
| } | | |

The auxiliary NIT 304, as defined by the Digital Video Broadcasting consortium (DVB) or any other suitable standard for conveying NIT-like information, conveys information relating to the physical organization of the multiplexes/TSs carried via a given network, and the characteristics of the network itself. The combination of original_network_id and transport_stream_id allow each transport to be uniquely identified. In a system consistent with the present invention, the auxiliary NIT 304 also provides information about an Auxiliary PAT 308 and Auxiliary PMT 312 unique to each transport.

The Auxiliary PAT descriptor is a private descriptor that identifies a designated auxiliary PAT and auxiliary PMT PID. Each designated auxiliary PAT PID descriptor uniquely defines the auxiliary PAT 308 and the auxiliary PMT 312 for that particular transport. The Auxiliary PAT descriptor can be listed in the second descriptor loop of the network information section of the auxiliary NIT. A preferred format (which is not to be considered limiting) is defined in Table 2 below. While Table 2 illustrates a syntax example for a DVB NIT, the present invention should not be limited to such syntax or to DVB. The descriptor—tag identifier can be different depending upon the standard used.

TABLE 2

| Syntax | No. of Bits | Identifier |
|---|---|---|
| auxiliary_PAT_descriptor( ){ | | |
|   descriptor_tag | 8 | 0xA3 |
|   descriptor_length | 8 | uimsbf |
|   reserved | 3 | bslbf |
|   auxiliary_PAT_PID | 13 | uimsbf |
| } | | |

In this exemplary embodiment, the following definitions are used:

descriptor_tag: An 8-bit field that is set to 0xA3 (or other suitable designated value) to identify this descriptor as an auxiliary_PAT_descriptor( ).

descriptor_length: An 8-bit field specifying the number of bytes immediately following the descriptor_length field up to the end of this descriptor.

auxiliary_PAT_PID: A 13-bit field which serves as a label for identification of the auxiliary PAT and auxiliary PMT, on the associated transport independent from any other entries.

The auxiliary NIT data is encapsulated in a UDP (User Datagram Protocol) packet and is delivered cyclically using an IP (Internet Protocol) multicasting method via the DOCSIS (Data Over Cable Service Interface Specification) network and is thus received as an out of band (OOB) communication via the STB's DOCSIS modem, in the present embodiment. In other embodiments, the auxiliary NIT data can be delivered by another type of modem or by any suitable inband or out of band communication mechanisms In order to receive the auxiliary NIT, the Set-top box is configured (e.g., at the factory or distributor or service provider) to receive the IP address and port number associated with the auxiliary NIT. The auxiliary NIT is transmitted repeatedly at, for example, 0.25 second intervals. Thus, STBs that are intended to utilize the multiple PID arrangement for providing selective encryption can be provided with the appropriate IP address and port number to be able to receive the auxiliary NIT.

Thus, in order to provide information used by the STB to decode and decrypt selectively encrypted programming, the auxiliary NIT is conveyed to the STB via an out of band DOCSIS modem. This auxiliary NIT is repeatedly broadcast by the cable system head end for receipt by a STB at the time of power up and as needed thereafter. When an auxiliary NIT is updated, a revision number is updated so that a STB or other suitable receiver that knows the IP address and Port number associated with the auxiliary NIT can periodically check for updated information in the auxiliary NIT. When the STB receives the auxiliary NIT, it parses the auxiliary NIT to determine information such as transport ID, frequency, Network ID, etc. to determine how to tune to an appropriate transport stream. In addition, the auxiliary NIT is parsed to find the designated PID which identifies packets that contain auxiliary PAT and auxiliary PMT tables 308 and 312. Thus, as shown in FIG. 3, the auxiliary NIT points the STB to a PID (P) within a particular transport stream that identifies the location of auxiliary PAT and auxiliary PMT tables. This enables the STB to find a set of primary and secondary PIDs associated with the elementary streams that contain a particular program.

Figure 4:
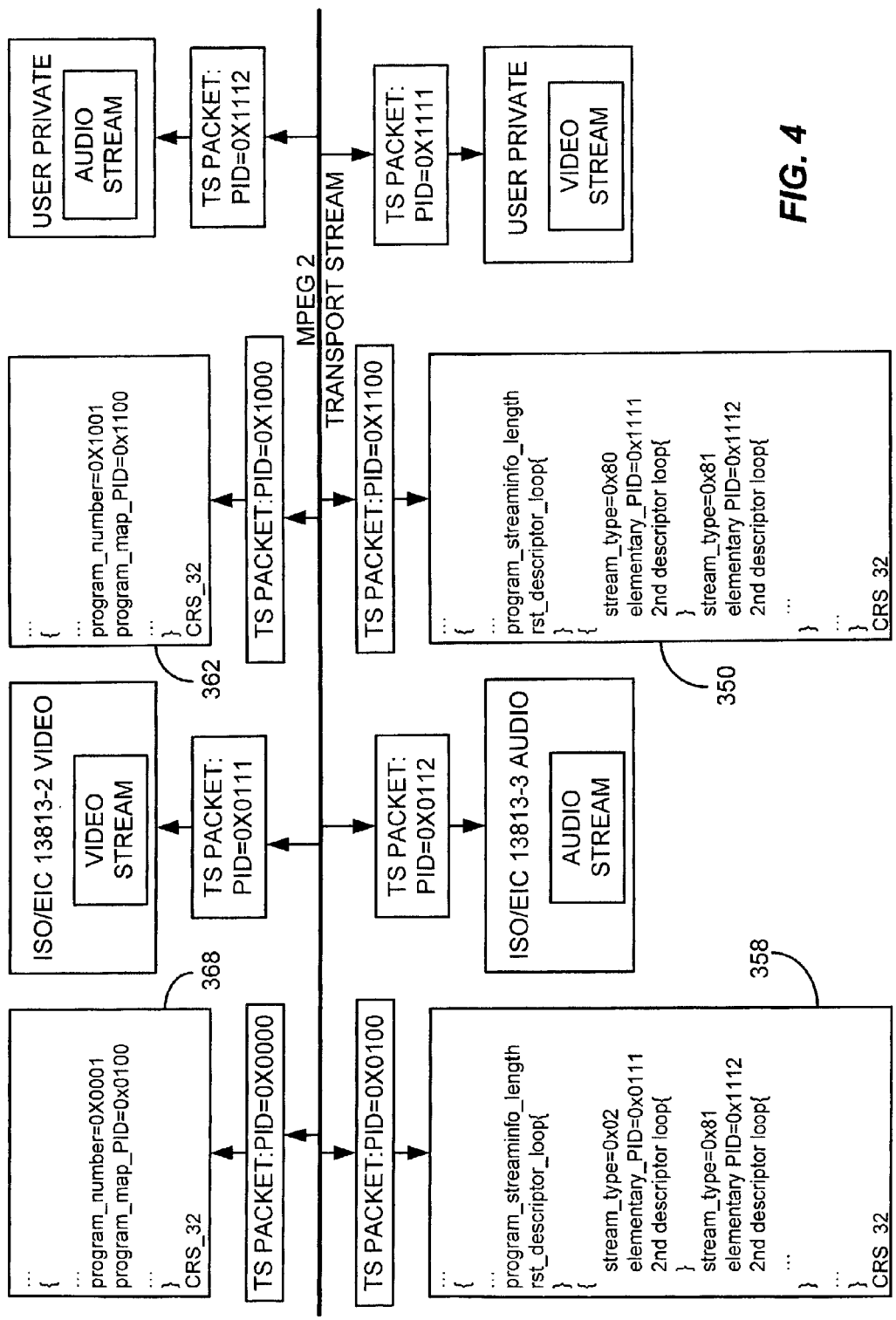
FIG. 4 illustrates an MPEG 2 transport stream with auxiliary program map and program association sections consistent with certain embodiments of the present invention.

An exemplary MPEG 2 transport stream incorporating the Auxiliary Program Map section 350 to supplement the conventional Program Map section 358 is illustrated in FIG. 4. Additionally, an Auxiliary Program Association section 362 supplements the conventional Program Association section 368 in this figure.

Figure 5:
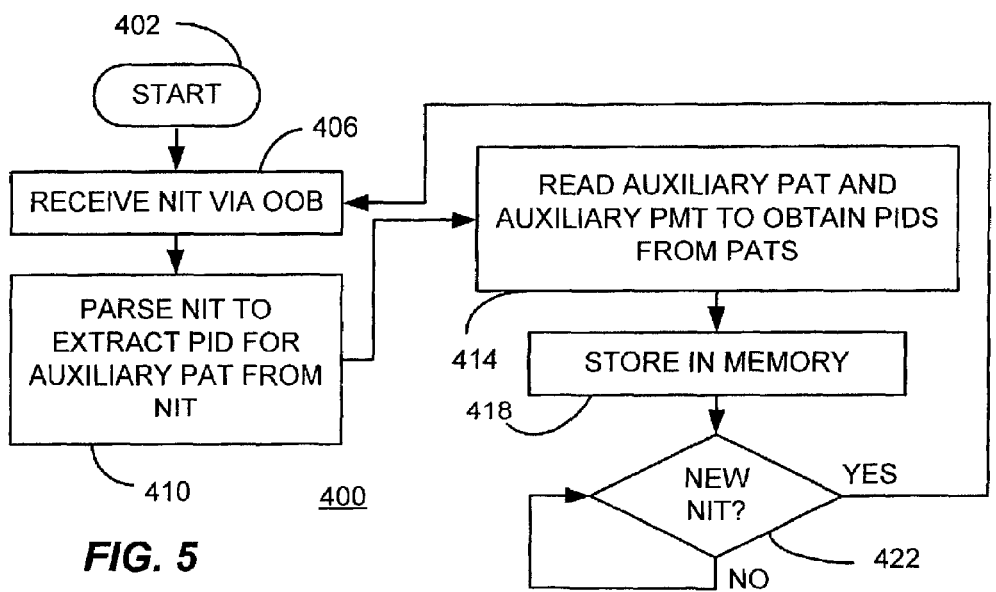
FIG. 5 is a flow chart depicting a television Set-top box process consistent with certain embodiments of the present invention.

The process 400 used by the STB to find and utilize the primary and secondary PID assignments that are stored in the auxiliary PAT and auxiliary PMT is shown in FIG. 5 starting at 402. At power on, the STB, for example using the out of band DOCSIS modem, listens for the next broadcast of the auxiliary NIT at 406. It should be noted, that other mechanisms for broadcast of a NIT used by legacy STBs may be simultaneously, but the legacy STB will be unaware of the auxiliary NIT and has no need for it. Similarly, non-legacy STBs may ignore the legacy NIT in favor of the auxiliary NIT. Once the auxiliary NIT is received at 406, it is parsed to extract a designated PID that identifies inband packets containing the auxiliary PAT and auxiliary PMT at 410. Other information, including, but not limited to, a frequency, transport ID, etc. that are used to access packets having the designated PID are also extracted from the auxiliary NIT.

The STB then tunes to the appropriate frequency and transport stream and looks for packets bearing the designated PID as an identifier. The auxiliary PAT and auxiliary PMT are then read from these packets to obtain a set of PIDs that identify the various elementary data streams associated with a particular program at 414. These PIDs and/or the auxiliary PAT and auxiliary PMT tables can be sent to the STB decoder circuit, etc. as needed and are stored in memory at 418 so that normal tuning, decoding and decryption operations can be carried out. The tables obtained by reference to the auxiliary NIT can be maintained until a change is implemented in the tables at the cable head end. At that point, a new auxiliary NIT may be transmitted with a new revision number over the DOCSIS channel. The STB monitors this revision number at 422 and if a new version is made available, the process repeats starting at 406. Otherwise, the process waits for revisions in the auxiliary NIT and continues to use the currently valid auxiliary NIT information. Whenever the auxiliary NIT is updated, the packets containing auxiliary PAT and auxiliary PMT tables may also be updated.

Thus, in certain embodiments consistent with the present invention, a method of obtaining program association information involves receiving a network information table; parsing the NIT to obtain a program identifier for packets containing an auxiliary program association table and an auxiliary program map table; and extracting the auxiliary PAT and auxiliary PMT to obtain PID values associated with programs.

Figure 6:
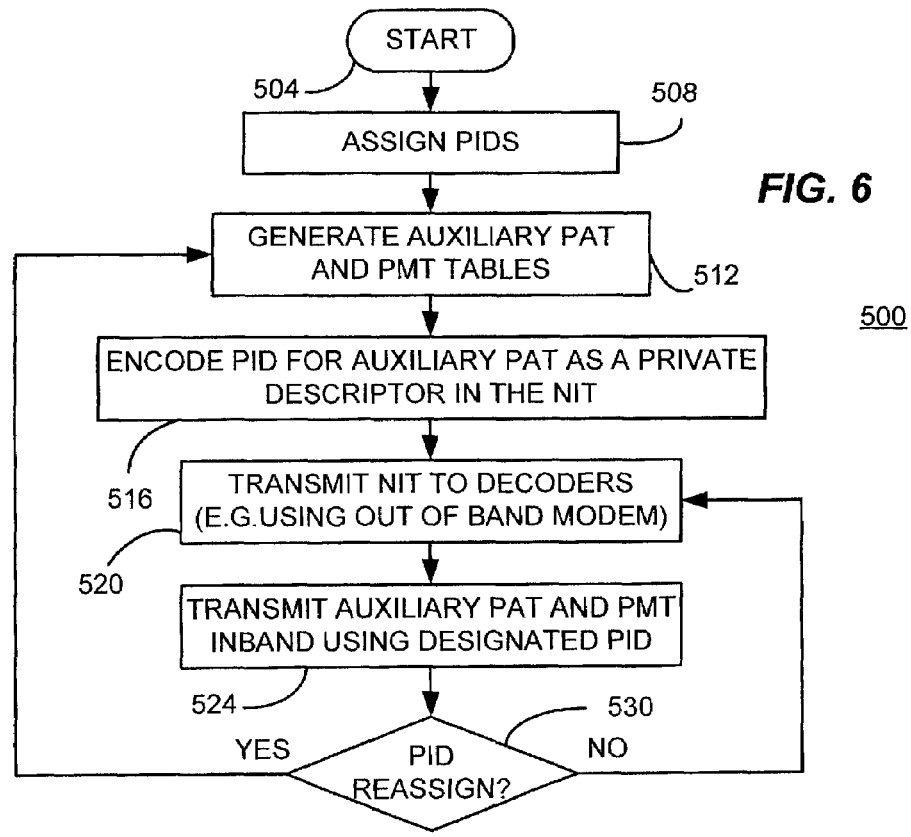
FIG. 6 is a flow chart depicting the operation of a cable system head end consistent with certain embodiments of the present invention.

With reference to FIG. 6, a process 500 as carried out at the cable system head end or other content provider is depicted starting at 504. In this process, when a PID assignment or reassignment is carried out at 508, auxiliary PAT and auxiliary PMT tables are generated at 512. A designated PID is then allocated, assigned and encoded as a private descriptor in the auxiliary NIT table at 516. The auxiliary NIT is assigned a new revision number and transmitted to the appropriate decoders (on a repetitive, ongoing basis) at 520 using the out of band DOCSIS channel. Similarly, the auxiliary PAT and auxiliary PMT tables are encoded within packets identified by the designated PID and are transmitted (on a repetitive, ongoing basis) using the inband channel designated in the auxiliary NIT at 524. This process of broadcast of the auxiliary NIT on the out of band channel as well as transmission of the auxiliary PAT and auxiliary PMT using the inband channel continues until a new PID assignment or reassignment occurs at 530. The process then repeats starting at 512.

Thus, in certain embodiments consistent with the present invention, a method of identifying programs in a digital video communication system involves generating an auxiliary program association table and an auxiliary program map table, wherein the auxiliary PAT and auxiliary PMT relate at least one program identifier to a program; packetizing the auxiliary PAT and auxiliary PMT and identifying packets containing the auxiliary PAT and auxiliary PMT using a designated PID; and encoding the designated PID as private descriptor in an auxiliary network information table.

Figure 7:
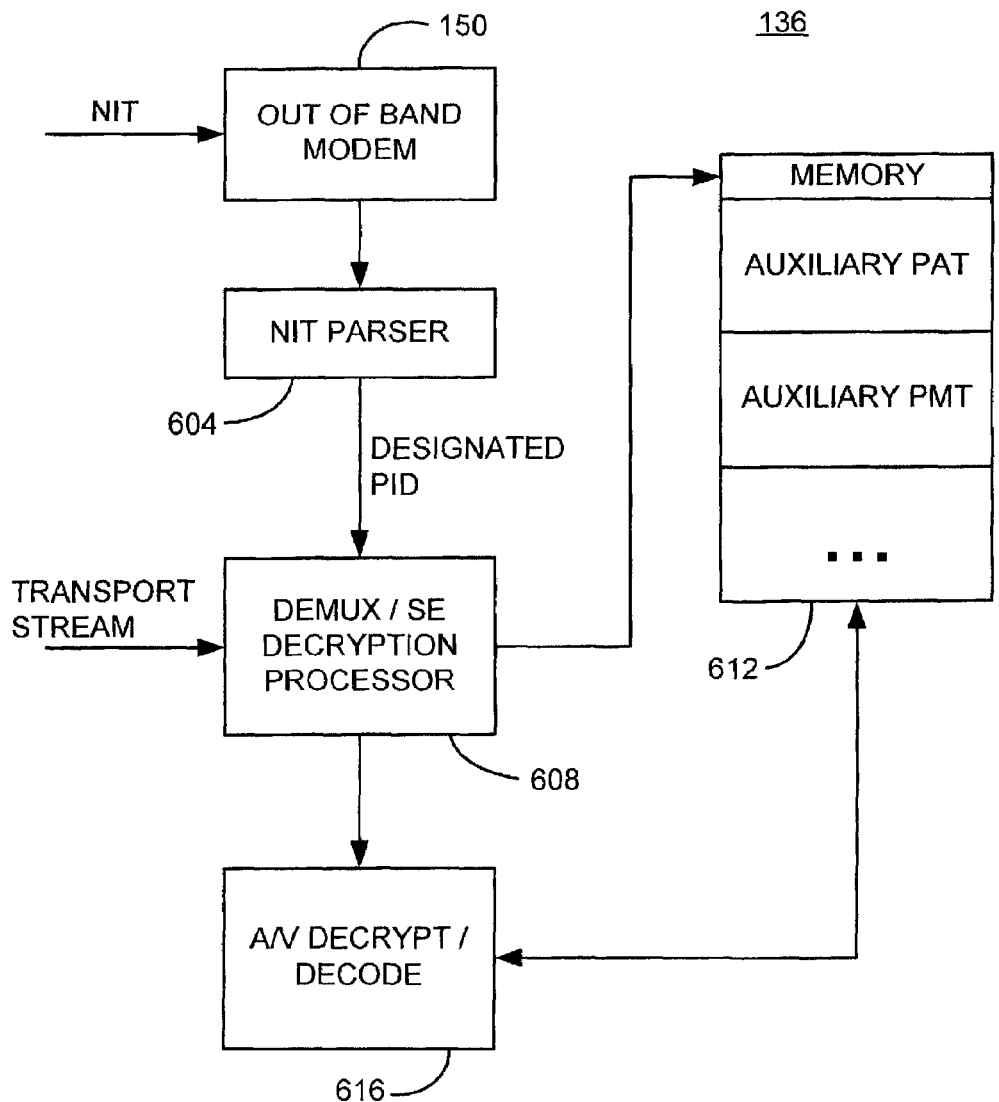
FIG. 7 is block diagram of television STB consistent with certain embodiments of the present invention.

FIG. 7 illustrates the components of an illustrative STB such as 136 or other receiver/decoder/decrypter device consistent with certain embodiments of the present invention. Device 136 has a modem such as a DOCSIS compliant modem 150 (or other suitable out of band or inband modem device) that receives the auxiliary network information table as an out of band transmission as previously described. Data received from the modem 150 is passed to a NIT parser 604 (which may be implemented as a hardware or software based device, and may form part of a central processing function). Parser 604 parses the auxiliary NIT to obtain a designated program identifier for packets containing an auxiliary program association table and an auxiliary program map table, and also obtains other information used to tune to an appropriate transport stream containing the auxiliary PAT and the auxiliary PMT. A demultiplexer/selective encryption decryption processor 608 then extracts packets containing the auxiliary PAT and auxiliary PMT based upon the designated PID received from the NIT parser to obtain PID values associated with programs. These the auxiliary PAT and the auxiliary PMT tables can then be stored in a memory 612 for use by an A/V decrypter/decoder 616 to produce output video signals suitable for use by a television display.

In accordance with certain embodiments consistent with the present invention, a data structure that conveys a program identifier has a network information table (NIT) and a program identifier (PID) forming a part of the NIT, the PID identifying packets that contain an auxiliary program association table used to decode a packetized digital video signal. The PID can be located at a second descriptor loop of the NIT. A data signal containing this data structure can be used in decoding a digital television signal. Such signal can be transmitted from a content provider to a television device, such as a television set or a television set top box using inband techniques or using an out of band modem such as a DOCSIS compliant modem.

By use of PAT and PID assignment mechanisms consistent with embodiments of the present invention, secondary PID values can be dynamically assigned in the event a secondary PID value that has previously been assigned is reassigned as a primary program identifier.

Those skilled in the art will recognize that the present invention has been described in terms of exemplary embodiments based upon use of a programmed processor. However, the invention should not be so limited, since the present invention could be implemented using hardware component equivalents such as special purpose hardware and/or dedicated processors which are equivalents to the invention as described and claimed. Similarly, general purpose computers, microprocessor based computers, micro-controllers, optical computers, analog computers, dedicated processors and/or dedicated hard wired logic may be used to construct alternative equivalent embodiments of the present invention.

Those skilled in the art will appreciate that the program steps and associated data used to implement the embodiments described above can be implemented using disc storage as well as other forms of storage such as for example Read Only Memory (ROM) devices, Random Access Memory (RAM) devices; optical storage elements, magnetic storage elements, magneto-optical storage elements, flash memory, core memory and/or other equivalent storage technologies without departing from the present invention. Such alternative storage devices should be considered equivalents.

The present invention, as described in embodiments herein, is implemented using programmed processors executing programming instructions that are broadly described above in flow chart form that can be stored on any suitable electronic storage medium or transmitted over any suitable electronic communication medium. However, those skilled in the art will appreciate that the processes described above can be implemented in any number of variations and in many suitable programming languages without departing from the present invention. For example, the order of certain operations carried out can often be varied, additional operations can be added or operations can be deleted without departing from the invention. Error trapping can be added and/or enhanced and variations can be made in user interface and information presentation without departing from the present invention. Such variations are contemplated and considered equivalent.

While the invention has been described in conjunction with specific embodiments, it is evident that many alternatives, modifications, permutations and variations will become apparent to those skilled in the art in light of the foregoing description. Accordingly, it is intended that the present invention embrace all such alternatives, modifications and variations as fall within the scope of the appended claims.

What is claimed is:

1. A method of identifying programs in a digital video communication system, comprising:
generating an auxiliary program association table (PAT) and an auxiliary program map table (PMT), wherein the auxiliary PAT and auxiliary PMT relate at least one program identifier (PID) to a program;
packetizing the auxiliary PAT and auxiliary PMT and identifying packets containing the auxiliary PAT and auxiliary PMT using a designated PID;
encoding the designated PID as private descriptor in a network information table (NIT); and
wherein the auxiliary PAT and the auxiliary PMT are different from a conventional PAT and a conventional PMT, and, wherein the auxiliary PAT and auxiliary PMT relate at least one program identifier (PID) to at least one portion of a program encrypted with a non-legacy encryption to distinguish the at least one portion of the program encrypted with the non-legacy encryption from the at least one portion of the program encrypted with a legacy encryption.

2. The method according to claim 1, further comprising transmitting the auxiliary PAT and the auxiliary PMT to a decoder, and transmitting the NIT to the decoder.

3. The method according to claim 1, wherein the auxiliary PAT and the auxiliary PMT are transmitted to the decoder as inband information.

4. The method according to claim 1, wherein the designated PID is transmitted to the decoder as out of band information.

5. The method according to claim 4, wherein the designated PID is listed in a second descriptor loop of the NIT.

6. The method according to claim 4, wherein the out of band information is transmitted to the decoder via a DOCSIS compliant modem.

7. The method according to claim 1, wherein the NIT further carries information needed to tune to a transport stream carrying the designated PID.

8. The method according to claim 1, carried out in a cable television system head end.

9. The method according to claim 1, further comprising generating the conventional program association table and the conventional program map table (PMT), wherein the conventional PAT and conventional PMT relate at least one program identifier (PID) to the program.

10. A computer readable storage medium storing instructions being executed on a programmed processor, carry out the method according to claim 1.

11. A method of obtaining program association information, comprising:
receiving a network information table (NIT);
parsing the NIT to obtain a designated program identifier (PID) encoded as private descriptor data for packets containing an auxiliary program association table (PAT) and an auxiliary program map table (PMT);
extracting the auxiliary PAT and auxiliary PMT to obtain PID values associated with programs; and wherein the auxiliary PAT and the auxiliary PMT are different from a conventional PAT and a conventional PMT, and, wherein the auxiliary PAT and auxiliary PMT relate at least one program identifier (PID) to at least one portion of a program encrypted with a non-legacy encryption to distinguish the at least one portion of the program encrypted with the non-legacy encryption from the at least one portion of the proeram encrypted with a legacy encryption.

12. The method according to claim 11, further comprising sending information from the auxiliary PAT and the auxiliary PMT to a decoder.

13. The method according to claim 11, wherein the auxiliary PAT and the auxiliary PMT are received as inband information.

14. The method according to claim 11, wherein the designated PID is received as out of band information.

15. The method according to claim 14, wherein the designated PID is listed in a second descriptor loop of the NIT.

16. The method according to claim 14, wherein the out of band information is received via a DOCSIS compliant modem.

17. The method according to claim 11, wherein the parsing the NIT further comprises obtaining other information needed to tune to a transport stream carrying the designated PID.

18. The method according io claim 11, carried out in a television Set-top box.

19. A computer readable storage medium storing instructions being executed on a programmed processor, carry out the method according to claim 10.

20. A digital video decoder device, comprising:
a modem that receives a network information table (NIT);
a NIT parser that parses the NIT to obtain a designated program identifier (PID) encoded as private descriptor data for packets containing an auxiliary program association table (PAT) and an auxiliary program map table (PMT);
a demultiplexer that extracts packets containing the auxiliary PAT and auxiliary PMT based upon the designated PID to obtain PID values associated with programs; and
wherein the auxiliary PAT and the auxiliary PMT are different from a conventional PAT and a conventional PMT, and, wherein the auxiliary PAT and auxiliary PMT relate at least one program identifier (PID) to at least one portion of a program encrypted with a non-legacy encryption to distinguish the at least one portion of the program encrypted with the non-legacy encryption from the at least one portion of the program encrypted with a legacy encryption.

21. The digital video decoder device according to claim 20, further comprising a memory for storing the auxiliary PAT and the auxiliary PMT.

22. The digital video decoder device according to claim 20, further comprising a decoder that decodes video programs identified by PID values stored in the auxiliary PAT and the auxiliary PMT.

23. The digital video decoder device according to claim 20, wherein the auxiliary PAT and the auxiliary PMT are received as inband information.

24. The digital video decoder device according to claim 20, wherein the modem comprises an out of band modem.

25. The digital video decoder device according to claim 20, wherein the modem comprises a DOCSIS compliant modem, and wherein the NIT is received via the DOCSIS compliant modem.

26. The digital video decoder device according to claim 20, wherein the designated PID is listed in a second descriptor loop of the NIT.

27. The digital video decoder device according to claim 20, wherein the NIT parser further parses the NIT to obtain other information needed to tune to a transport stream carrying the designated PID.

28. The digital video decoder device according to claim 20, embodied in a television Set-top box.

29. A television Set-top box, comprising:
an out of band DOCSIS compliant modem that receives a network information table (NIT);
a NIT parser that parses the NIT to obtain a designated program identifier (PID) encoded as private descriptor data for packets containing an auxiliary program association table (PAT) and an auxiliary program map table (PMT), wherein the designated PID is listed in a second descriptor loop of the NIT, and wherein the NIT parser further parses the NIT to obtain other information needed to tune to a transport stream carrying the designated PID;
a demultiplexer that extracts packets from inband transport streams containing the auxiliary PAT and auxiliary PMT based upon the designated PID to obtain PID values associated with programs;
a memory for storing the auxiliary PAT and the auxiliary PMT;
a decoder that decodes video programs identified by PID values stored in the auxiliary PAT and the auxiliary PMT and provides an output signal suitable for driving a television display; and
wherein the auxiliary PAT and the auxiliary PMT are different from a conventional PAT and a conventional PMT, and, wherein the auxiliary PAT and auxiliary PMT relate at least one program identifier (PID) to at least one portion of a program encrypted with a non-legacy encryption to distinguish the at least one portion of the program encrypted with the non-legacy encryption from the at least one portion of the program encrypted with a legacy encryption.

* * * * *

UNITED STATES PATENT AND TRADEMARK OFFICE
CERTIFICATE OF CORRECTION

PATENT NO. : 7,409,702 B2  
APPLICATION NO. : 10/393324  
DATED : August 5, 2008  
INVENTOR(S) : Cao Page 1 of 1

It is certified that error appears in the above-identified patent and that said Letters Patent is hereby corrected as shown below:

In Col. 3, Line 48, delete "Si" and insert -- SI -- therefor.

In Claim 11, Col. 11, Line 8, delete "proeram" and insert -- program -- therefor.

Signed and Sealed this

Twenty-third Day of September, 2008

JON W. DUDAS  
*Director of the United States Patent and Trademark Office*